F. G. SCHRANZ.
METAL EXTRUSION PRESS.
APPLICATION FILED AUG. 4, 1920.
1,393,579.
Patented Oct. 11, 1921.
6 SHEETS—SHEET 1.
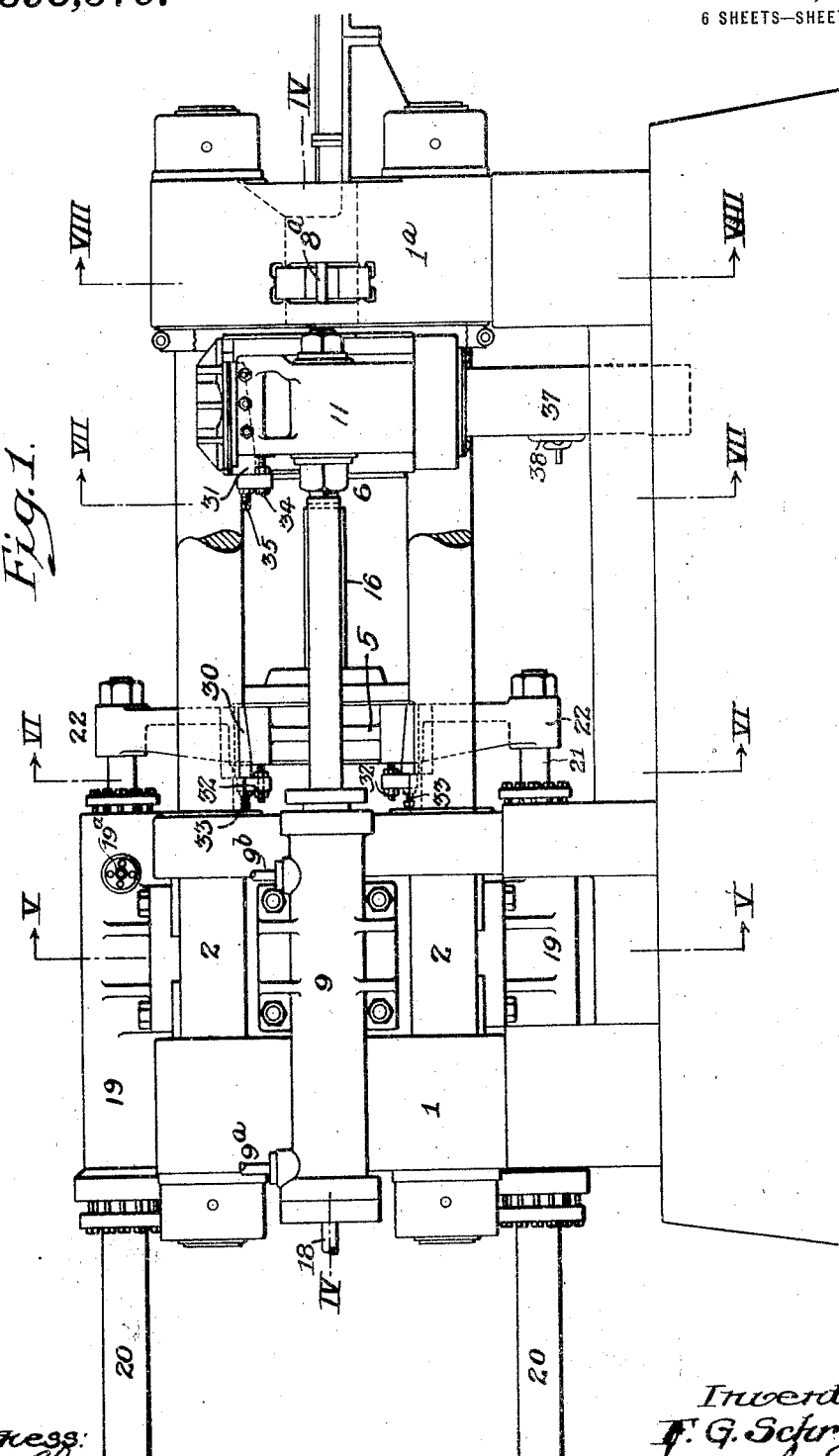

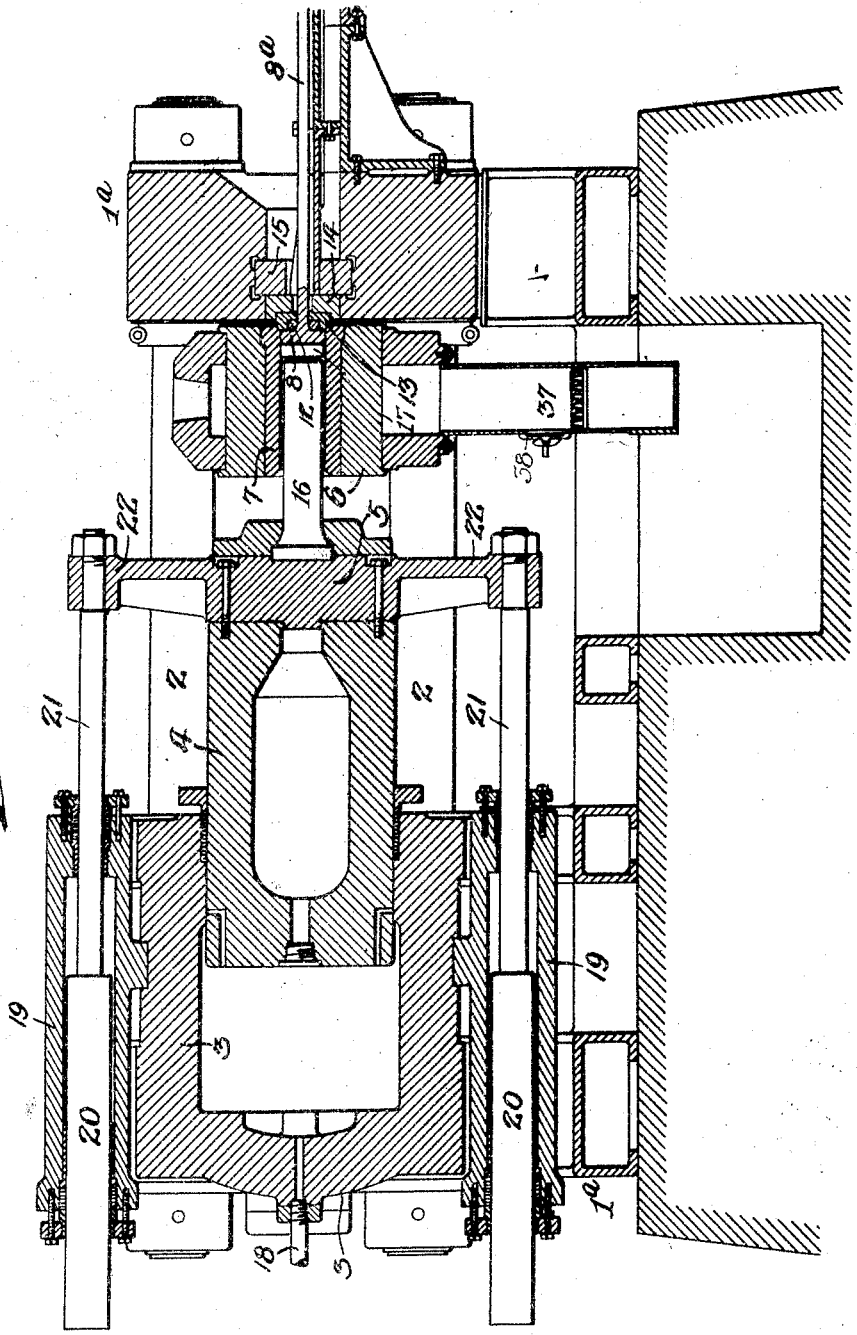

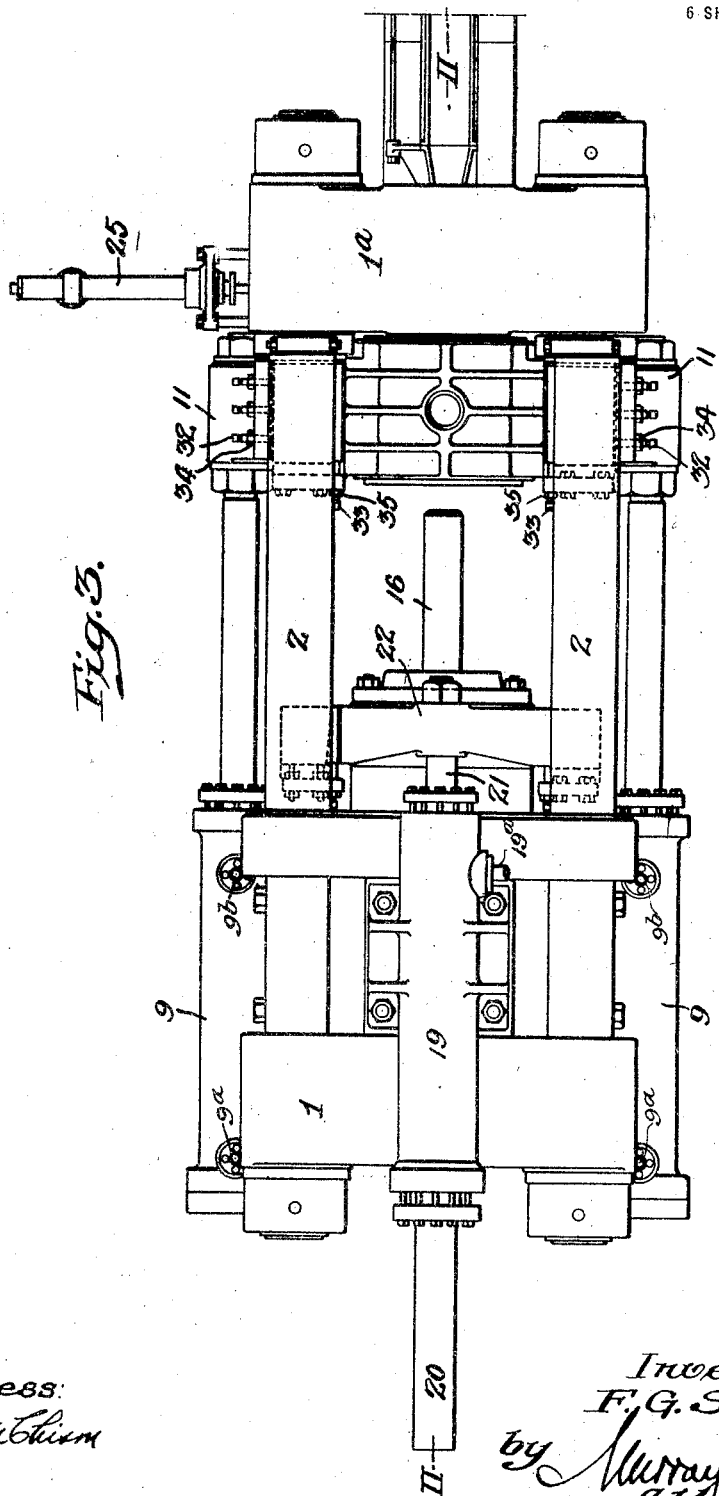

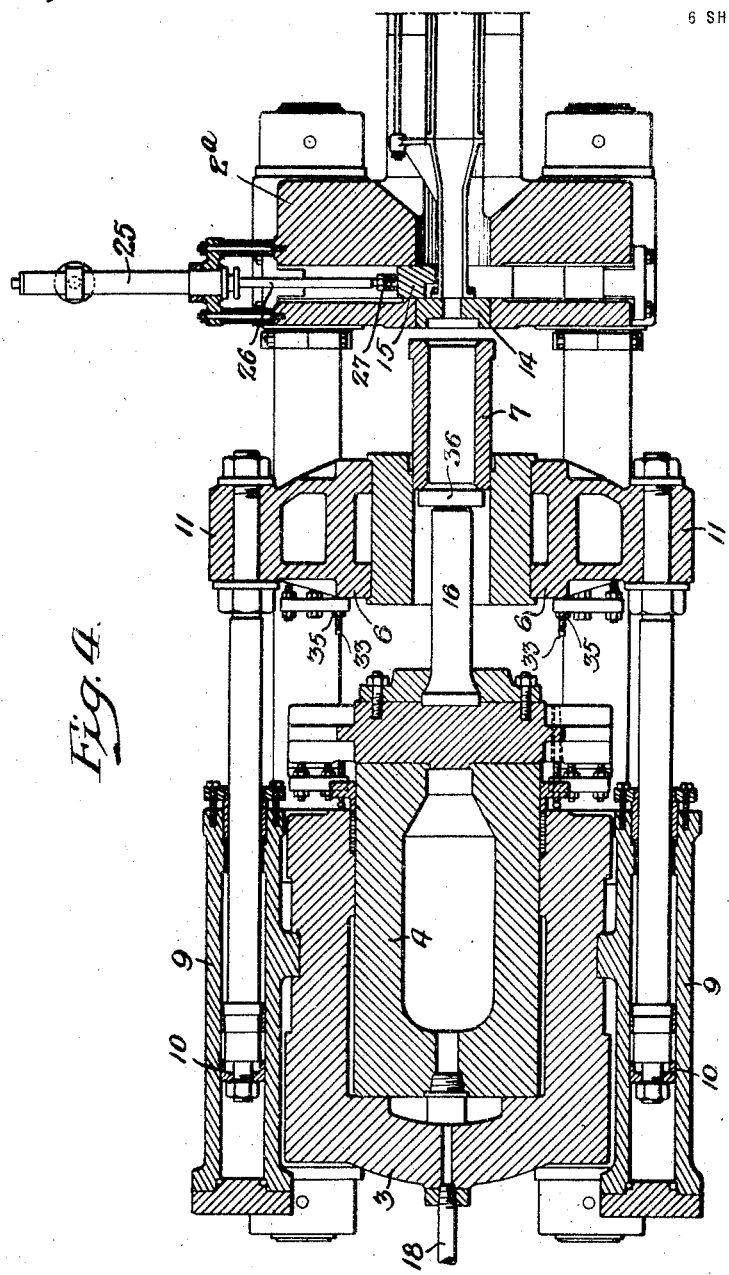

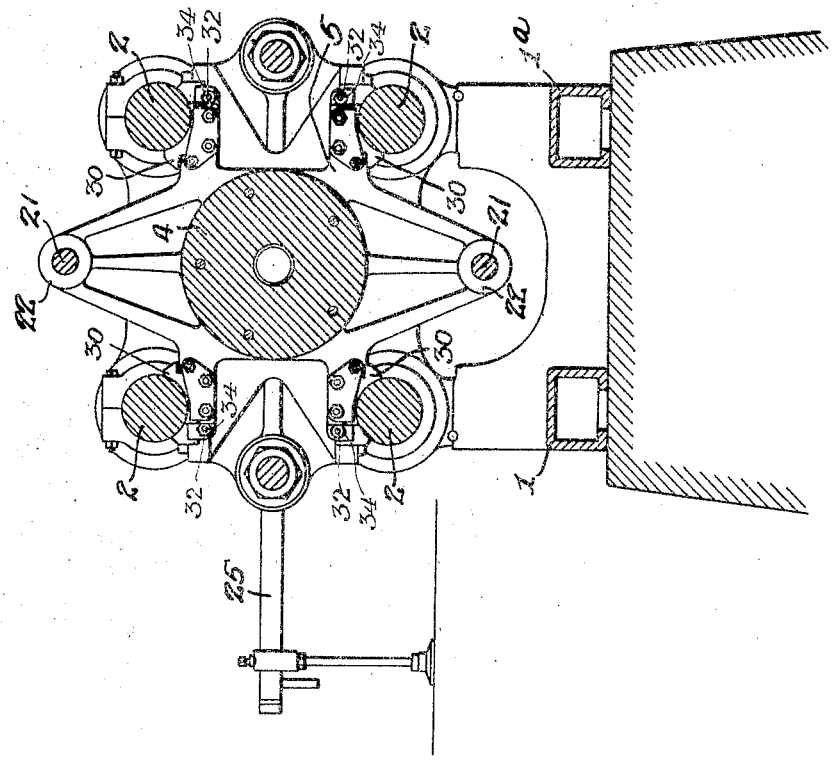
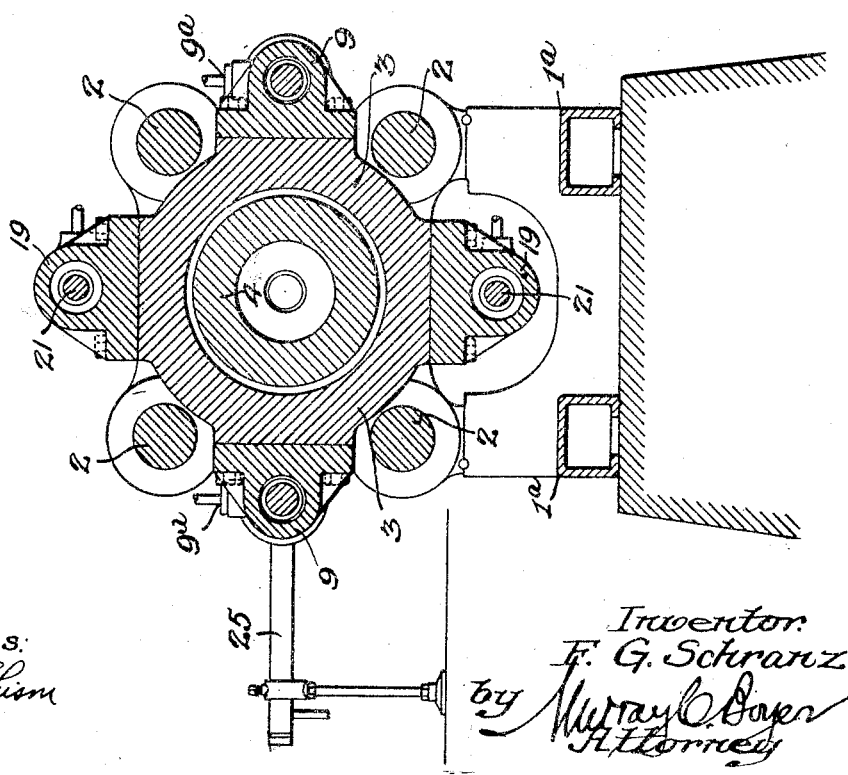

F. G. SCHRANZ.
METAL EXTRUSION PRESS.
APPLICATION FILED AUG. 4, 1920.
1,393,579.
Patented Oct. 11, 1921.
6 SHEETS—SHEET 6.
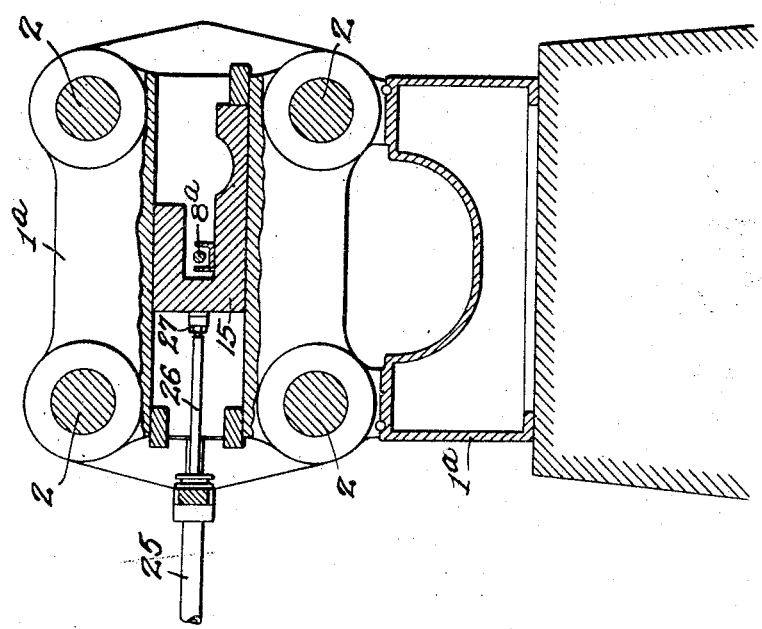
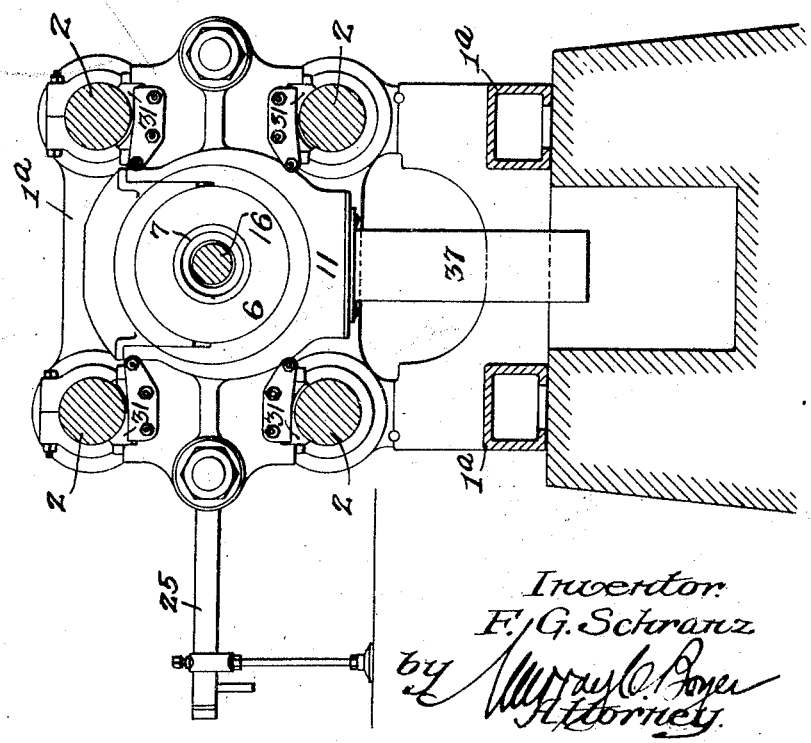
Witness:
Walter Chism
Inventor
F. G. Schranz
by Murray C. Boyer
Attorney

UNITED STATES PATENT OFFICE.

FREDERICK GEORGE SCHRANZ, OF PHILADELPHIA, PENNSYLVANIA.

METAL-EXTRUSION PRESS.

1,393,579.     Specification of Letters Patent.     Patented Oct. 11, 1921.

Application filed August 4, 1920. Serial No. 401,115.

*To all whom it may concern:*

Be it known that I, FREDERICK GEORGE SCHRANZ, a citizen of the United States, and a resident of Philadelphia, Pennsylvania, have invented certain new and useful Improvements in Metal-Extrusion Presses, of which the following is a specification.

My invention relates to apparatus for extruding rods, tubes, and the like, from solid metal, usually heated billets of non-ferrous metal, and one object of my invention is to provide simple and efficient means for readily moving the extrusion plunger in both directions; into and away from engagement with the billet from which the rod or tube is extruded.

A further object of my invention is to provide a movable housing or cross-head for carrying the heated billet, whereby means are provided for moving the latter when desired; should it cool too soon, or should anything prevent its proper reduction; such means also permitting the removal of a billet-receiving sleeve carried by such housing or cross-head should such sleeve freeze to the billet or become worn; thereby permitting the replacement of a fresh sleeve without dismantling the entire machine.

A further object of my invention is to provide means, which may be carried by the main cylinder, for effecting movement of the billet-receiving housing or cross-head independently of the movement of the main piston carrying the extrusion plunger.

A further object of my invention is to provide improved means for retracting the main piston carrying the extrusion plunger.

A further object of my invention is to provide an improved form of die carrier which is movable into position with respect to the billet-receiving sleeve, and may be moved away from such position to permit entrance of the billet.

A further object of my invention is to provide means for moving the cross-head connected to the main piston independently of the latter, should it be necessary for repairs or desirable for other reasons.

A further object of my invention is to provide simple and efficient means for setting up and maintaining the several parts of the structure in proper alinement, and a still further object of my invention is to arrange the several parts of the structure easy of access in order that any necessary repairs or partial dismantling can be effected easily and expeditiously and without taking down the whole machine.

These and other features of my invention are more fully described hereinafter; reference being had to the accompanying drawings, in which:

Figure 1, is a side elevation of one form of metal extrusion press having and containing the features forming the subject of my present invention.

Fig. 2, is a longitudinal sectional view, on the line II—II, Fig. 3.

Fig. 3, is a plan view of my improved extrusion press.

Fig. 4, is a sectional plan view, on the line IV—IV, Fig. 1, and

Figs. 5, 6, 7 and 8, are sectional views on the lines V—V, VI—VI, VII—VII and VIII—VIII, respectively, Fig. 1.

In the drawings, 1 and $1^a$, represent end housings or supports in which the ends of horizontally disposed rods 2 are suitably secured; the latter supporting a cylinder or casing 3, in which the main piston 4 is disposed; a cross-head 5, to which said piston is secured, and a movable cross-head or housing 6, carrying a sleeve 7, which receives a billet 8, from which a metal rod or tube may be extruded.

The movable housing or cross-head 6 is normally held in the position illustrated in Figs. 1, 2 and 3, adjacent to the housing $1^a$, and is maintained in such position by fluid under pressure within so-called "push cylinders" 9, disposed at the sides of the main cylinder 3; such pressure acting upon the rear ends of pistons 10 disposed in said push cylinders; which pistons are connected with side arms or extensions 11 of the cross-head or housing 6. This pressure, entering these cylinders via the pipes $9^a$, is constant while the machine is in operation so that the parts are normally maintained in the position referred to. When it is desired to move the cross-head or housing 6 toward the cylinder 3, the pipes $9^a$ may be opened to exhaust and pressure may then enter the pipes $9^b$ to retract the pistons 10.

Disposed within the cross-head or housing 6, and in axial alinement with the cylinder 3, is the sleeve 7 adapted to receive the billet 8, from which a rod or tube, indicated at $8^a$, is extruded through a suitable die 12, which may be mounted in a die-block 13, disposed in a support 14 carried by the fixed housing $1^a$ and, when the press is in operation, is held against displacement by a slidable thrust-block 15.

The main cylinder 3 contains the piston 4, suitably connected to the cross-head 5; the latter carrying a plunger 16, in axial alinement with the sleeve 7 carried by the cross-head or housing 6, which plunger is designed to act upon the billet disposed in said sleeve when the piston 4 moves on its working stroke; a wear-block 17 being preferably interposed between said plunger 16 and the billet.

Pressure to move the piston 4 outwardly or on its working stroke, enters via a pipe 18 at the rear of the cylinder 3, and by means of suitable connections (not shown), this same pressure communicates with so-called "pull-back" cylinders 19, disposed above and below the cylinder 3, and containing pistons or plungers 20, having rods 21, connected to arms 22, of the cross-head 5; such pressure being constant in said cylinders 19. As soon as the line leading to the inlet 18, of the cylinder 3 is open to exhaust, the constant pressure on the pistons 20, within the "pull back" cylinders 19, which pressure may enter via the pipe 19ª, retracts the cross-head 5, carrying the plunger 16 out of the sleeve 7; leaving the latter free to receive a fresh billet.

The area of the piston 4 being so much greater than the area of the pistons or plungers 20 exposed to the same pressure, there is no retardation on the forward or working stroke of the main piston. As soon as the pessure on the main piston is relieved, however, the pistons or plungers 20 act to retract the main piston and its connected parts.

After a billet has been reduced to the extent shown in Fig. 2 the thrust-block 15 is withdrawn, and for this purpose I may provide fluid pressure means; a cylinder 25 containing a piston to which is attached a rod 26, connected at 27 to said thrust-block; being disposed at the side of the machine and being movable at right angles to the longitudinal axis thereof. The die and die-block may be removed after the thrust-block has been withdrawn, and the extruded rod or tube, with the stub of metal in the die 12, is carried away from the machine by suitable means; a suitable trough being provided to receive such rod or tube.

Immediately after the die has been removed from the housing 1ª, a fresh billet is inserted in the sleeve 7, preferably by the means employed to remove the extruded rod or tube and the stub end of the previous billet, but operating in the opposite direction; the die and die-block are then inserted in proper position in the cross-head or housing 6, and the thrust-block 15 is moved into position to support the die and die-block. Meanwhile, the main cylinder 3 having been opened to exhaust, the constant pressure on the pistons within the "pull-back" cylinders 19, has caused them to carry back the cross-head 5 and the plunger 16 attached thereto, with the main piston 4, and the machine is then ready for operation on the next billet, and so on.

In a co-pending application filed August 4, 1920, Serial Number 401,116, I have described and claimed means for carrying away from the press the extruded rods and tubes, and cutting the stub ends of the billets therefrom; the conveyer serving to introduce fresh billets to the sleeve 7, when retracted to bring the die, die-block and support to position.

In order to maintain the parts so that the cross-heads 5 and 6 may be kept in proper alinement and moved on the rods 2 with precision, I provide adjustable wedge-blocks 30, carried by the cross-head 5, and similar adjustable wedge-blocks 31, carried by the movable cross-head or housing 6. These wedge-blocks 30 and 31, may be set up by screws 32 and 33, respectively, and held in their adjusted positions by lock-nuts 34 and 35, respectively.

In case a billet should freeze in the billet-receiving sleeve 7, or whenever the latter becomes worn, such sleeve, with or without the billet, may be removed by imparting movement to the cross-head or housing 6, toward the cylinder 3. In such instance, pressure is directed through the pipes 9ᵇ to the front ends of the pistons 10 in the so-called "push-cylinders" 9, and by interposing a suitable block 36 between the end of the plunger 16 and said sleeve 7, the latter may be displaced, as indicated in Fig. 4.

The cross-head or housing 6 may be provided with the usual means, in the form of a suitable stove 37, depending therefrom and movable therewith, for maintaining the heat of the billet container during the process of extruding the billet through the die 12, such stove having the usual fuel inlet which may be closed by a door 38.

It will be understood, of course, that my improved extrusion press is provided with the usual piping to convey fluid under pressure, with the necessary valves, manual controlling means, and other accessories, necessary for the purpose of operating the several pistons or plungers; all of which is common in the art to which my invention relates.

I claim:

1. The combination, in a metal extruding press, of a cylinder, a piston therein, a cross-head carried by said piston, auxiliary pistons connected to said cross-head, cylinders for the same, means for directing pressure to the several cylinders; the pressure in said auxiliary cylinders being constant, and means for exhausting pressure from the main cylinder whereby the constant pressure of the auxiliary cylinders may actuate the auxiliary pistons to retract the cross-head and the main piston.

2. The combination, in a metal extruding press, of a cylinder, a piston therein, a cross-head carried by said piston, auxiliary cylinders carried by the main cylinder, pistons in said auxiliary cylinders connected to said cross-head, means for directing pressure to the main cylinder to move the piston therein in one direction; such pressure being in constant communication with the auxiliary cylinders, and means for relieving the pressure in the main cylinder whereby the constant pressure in the auxiliary cylinders may actuate the pistons therein to retract the cross-head and main piston.

3. The combination, in a metal extruding press, of a cylinder, a movable housing or cross-head normally occupying a fixed position with respect to said cylinder, auxiliary cylinders carried by said main cylinder, pistons therein connected to said movable cross-head or housing, and means for directing pressure to said auxiliary cylinders whereby said cross-head or housing may be moved in both directions with respect to the main cylinder.

4. The combination, in a metal extruding press, of a cylinder, a piston therein, a cross-head carried by said piston, a plunger carried by said cross-head, an auxiliary piston connected to the cross-head, a cylinder for the same, means for directing pressure to the main cylinder and said auxiliary cylinder; the pressure being constant in the latter, means for exhausting pressure from the main cylinder whereby the constant pressure in the auxiliary cylinder may retract the cross-head and the main piston, a cross-head or housing at the opposite end of the press, and a removable billet-receiving sleeve disposed in said last-mentioned cross-head in axial alinement with the plunger.

5. The combination, in a metal extruding press, of a fixed cylinder, a movable cross-head or housing normally occupying a fixed position with respect to said cylinder, an auxiliary cylinder carried by said main cylinder, a piston therein connected to said movable cross-head or housing, and means for directing pressure to said auxiliary cylinder whereby said cross-head may be moved in both directions with respect to the main cylinder.

6. The combination, in a metal extruding press, of a cylinder, a piston therein, a cross-head connected to said piston, auxiliary cylinders carried by said main cylinder, pistons therein connected to said cross-head, and means for directing pressure to said cylinders whereby said cross-head may be moved with respect to the main cylinder; one of said pistons moving said cross-head on its working stroke.

7. The combination, in a metal extruding press, of a main cylinder, a piston therein, a cross-head connected to said piston, a movable cross-head or housing at the opposite end of the press, a plurality of auxiliary cylinders carried by said main cylinder, pistons therein connected with each of said cross-heads, and means for directing pressure to said auxiliary cylinders whereby each of said cross-heads may be moved with respect to the main cylinder.

8. The combination, in a metal extruding press, of a movable cross-head or housing, normally fixed, a removable billet-receiving sleeve carried by said cross-head or housing, a plunger at the opposite end of the press, and means for moving said cross-head or housing whereby the sleeve may be brought into contact with said plunger and displaced from said cross-head or housing.

9. The combination, in a metal extruding press, of a pair of end housings or supports, a movable cross-head or housing normally fixed in position adjacent to one of said supports, a billet-receiving sleeve carried by said cross-head, a die-block mounted in said support, a die interposed between said cross-head and die-block, a slidable thrust-block mounted in the support, and means for moving said thrust-block into and of engagement with said die-block.

10. The combination, in a metal extruding press, of a removable billet-receiving sleeve, and a movable carrier for the same.

11. The combination, in a metal extruding press, of a removable billet-receiving sleeve, and a carrier for said sleeve.

12. The combination, in a metal extruding press, of a cross-head capable of movement but normally fixed, and a billet-receiving sleeve removably disposed in said cross-head.

13. The combination, in a metal extruding press, of a cross-head, a billet-receiving sleeve removably disposed in said cross-head, a plunger axially mounted with respect to said billet-receiving sleeve, and means for causing said plunger to move with respect to said billet-receiving sleeve.

14. The combination, in a metal-extruding press, of a pair of cross-heads oppositely disposed with their centers in axial alinement, a plunger carried by one of said cross-heads, a billet receiving sleeve carried by the other cross-head, and means for effecting movement of said plunger and billet-receiving sleeve relatively to each other.

15. The combination, in a metal extruding press, of a cross-head or housing, a billet-receiving sleeve mounted therein; said sleeve being removable, a plunger adapted to occupy a fixed position with respect to said cross-head or housing, and means for moving the latter with respect to said plunger whereby the latter may act to remove said billet-receiving sleeve from the cross-head.

16. The combination, in a metal extruding press, of a cross-head or housing, horizontal supports for the same, means for moving said cross-head or housing, and adjustable bearings between the same and said supports.

17. The combination, in a metal extruding press, of a cross-head or housing normally fixed, a cylinder, a piston therein, a cross-head carried by said piston and movable therewith, horizontal supports for each of said cross-heads, and adjustable bearings between each of said cross-heads and said supports.

18. The combination, in a metal extruding press, of a pair of end housings or supports, a pair of cross-heads movably mounted between said supports, means for moving either of said cross-heads with respect to the other, a plunger carried by one of said cross-heads, and a removable billet-receiving sleeve carried by the other cross-head; said plunger and sleeve coöperating to extrude a billet from the sleeve or to strip the sleeve from its cross-head.

19. The combination, in a metal extruding press, of a cylinder, a piston therein, a cross-head carried by said piston, a pair of auxiliary pistons carried by said cross-head; cylinders for said pistons disposed in a vertical plane, a cross-head at the opposite end of the press, a pair of cylinders disposed in a horizontal plane, and pistons adapted to each latter cylinders and connected to said last mentioned cross-head whereby the latter may be moved with respect to the main cylinder.

20. The combination, in a metal extruding press, of a cylinder, a piston therein, a cross-head connected to said piston, auxiliary pistons connected to said cross-head above and below the main cylinder, cylinders for said auxiliary pistons, means for directing pressure to the several cylinders; the pressure in said auxiliary cylinders being constant, and means for opening the main cylinder to exhaust whereby the constant pressure in the auxiliary cylinders may actuate the pistons therein to retract the cross-head and the main piston.

21. The combination, in a metal extruding press, of a cylinder, a piston therein, a cross-head connected to said piston, auxiliary cylinders carried by the main cylinder above and below the same, pistons in said auxiliary cylinders connected to said cross-head; a second cross-head, a second set of auxiliary cylinders carried by the main cylinder, pistons in said second set of auxiliary cylinders, and means for actuating said several pistons including means for relieving the pressure in the main cylinder whereby the constant pressure in the first-named auxiliary cylinders may actuate the pistons therein to retract the first-named cross-head and the main piston; the second-named cross-head normally occupying a fixed position during the operative movements of the other cross-head.

22. The combination, in a metal extruding press, of a main cylinder, a movable housing or cross-head normally occupying a fixed position with respect to said cylinder, and fluid-pressure means operatively connected thereto whereby said cross-head may be reciprocated with respect to the main cylinder.

23. The combination, in a metal extruding press, of a cylinder, a piston therein, a cross-head carried by said piston, a plunger carried by said cross-head, means for reciprocating said cross-head and plunger, a cross-head or housing at the opposite end of the press, and a removable billet-receiving sleeve disposed in said last-mentioned cross-head in axial alinement with the plunger.

24. The combination, in a metal extruding press, of a fixed cylinder, a movable cross-head or housing normally occupying a fixed position with respect to said cylinder and having its center in axial alinement therewith, a pair of auxiliary cylinders carried by said main cylinder, pistons therein connected to said movable cross-head or housing, means for directing pressure to said auxiliary cylinders whereby said cross-head may be reciprocated with respect to the main cylinder, and guides for maintaining the axial alinement of said cross-head during reciprocation thereof.

25. The combination, in a metal extruding press, of a main cylinder, a piston therein, a cross-head connected to said piston and having its center in axial alinement therewith, auxiliary cylinders carried by said main cylinder, pistons therein connected to said cross-head, means for directing pressure to said cylinders whereby said cross-head may be moved with respect to the main cylinder; one of said pistons moving said cross-head on its working stroke, and guides for maintaining the axial alinement of said cross-head during its movements.

26. The combination, in a metal extruding press, of a main cylinder, a piston therein, a cross-head connected to said piston, a movable cross-head or housing at the opposite end of the press; said cross-heads having their centers in axial alinement with said piston, a plurality of auxiliary cylinders carried by said main cylinder, pistons therein connected with said cross-heads, means for directing pressure to said auxiliary cylinders whereby each of said cross-heads may be moved with respect to the main cylinder, and independent sets of guides for maintaining the axial alinement of said cross-heads during their movements.

27. The combination, in a metal extruding press, of a pair of end housings or supports, a movable cross-head or housing normally fixed in position adjacent to one of said supports, a billet-receiving sleeve carried by said cross-head, a die-block mounted in said support, and a slidable thrust-block operable in said support into and out of engagement with said die-block.

28. The combination, in a metal extruding press, of a pair of end housings or supports, a pair of cross-heads movably mounted between said supports, and means for moving either of said cross-heads with respect to the other.

29. The combination, in a metal extruding press, of a main cylinder, a piston therein, a cross-head connected to said piston, a pair of auxiliary pistons connected to said cross-head, cylinders for said auxiliary pistons carried by the main cylinder, a cross-head at the opposite end of the press, a second pair of cylinders carried by the main cylinder, pistons adapted to said latter cylinders and connected to said last-mentioned cross-head whereby the latter may be moved with respect to the main cylinder, means for directing fluid under pressure to actuate said pistons, and means for axially guiding said cross-heads while the same are being moved.

In witness whereof I have signed this specification.

FREDERICK GEORGE SCHRANZ.